US012583279B2

(12) United States Patent
Bölling et al.

(10) Patent No.: US 12,583,279 B2
(45) Date of Patent: Mar. 24, 2026

(54) CONTROL VALVE DEVICE FOR CONTROLLING DAMPING CHARACTERISTICS, AND HYDRAULIC FLOW-THROUGH SOLENOID VALVE

(71) Applicant: ETO MAGNETIC GmbH, Stockach (DE)

(72) Inventors: Sebastian Bölling, Uhldingen-Mühlhofen (DE); Timo Rigling, Moos (DE); Luca Veser, Radolfzell (DE)

(73) Assignee: ETO MAGNETIC GmbH, Stockach (DE)

( * ) Notice: Subject to any disclaimer, the term of this patent is extended or adjusted under 35 U.S.C. 154(b) by 0 days.

(21) Appl. No.: 18/720,753

(22) PCT Filed: Dec. 19, 2022

(86) PCT No.: PCT/EP2022/086733
§ 371 (c)(1),
(2) Date: Aug. 27, 2024

(87) PCT Pub. No.: WO2023/117959
PCT Pub. Date: Jun. 29, 2023

(65) Prior Publication Data
US 2025/0058598 A1 Feb. 20, 2025

(30) Foreign Application Priority Data
Dec. 23, 2021 (DE) ..................... 10 2021 134 565.0

(51) Int. Cl.
*B60G 17/08* (2006.01)
*B60G 17/016* (2006.01)

(52) U.S. Cl.
CPC ........... *B60G 17/08* (2013.01); *B60G 17/016* (2013.01); *B60G 2202/414* (2013.01);
(Continued)

(58) Field of Classification Search
CPC ............................ B60G 17/08; B60G 17/016; B60G 2202/414; B60G 2204/62; B60G 2500/11;
(Continued)

(56) References Cited

U.S. PATENT DOCUMENTS 5,551,541 A 9/1996 Förster
9,845,131 B2 * 12/2017 Murakami ............... B62J 45/41
(Continued)

FOREIGN PATENT DOCUMENTS

DE 102007005466 A1 8/2007
DE 102008035899 A1 2/2010
(Continued)

OTHER PUBLICATIONS

German Search Report dated Jan. 9, 2023 issued in corresponding German Patent Application No. DE 10 2021 134 565.0 (and English translation).
(Continued)

*Primary Examiner* — Toan C To
(74) *Attorney, Agent, or Firm* — Posz Law Group, PLC

(57) ABSTRACT

A control valve device for a regulation of damping characteristics, in particular of shock absorbers, includes a valve slide and a hydraulic fail-safe unit which is configured, in a de-energized operation state, to provide a fail-safe damping characteristic of the valve slide, the damping hardness of which in a rebound direction lies between a minimally possible rebound damping hardness and a maximally possible rebound damping hardness, and the damping hardness of which in a compression direction lies between a minimally possible compression damping hardness and a maximally possible compression damping hardness.

19 Claims, 5 Drawing Sheets

Figure 1:
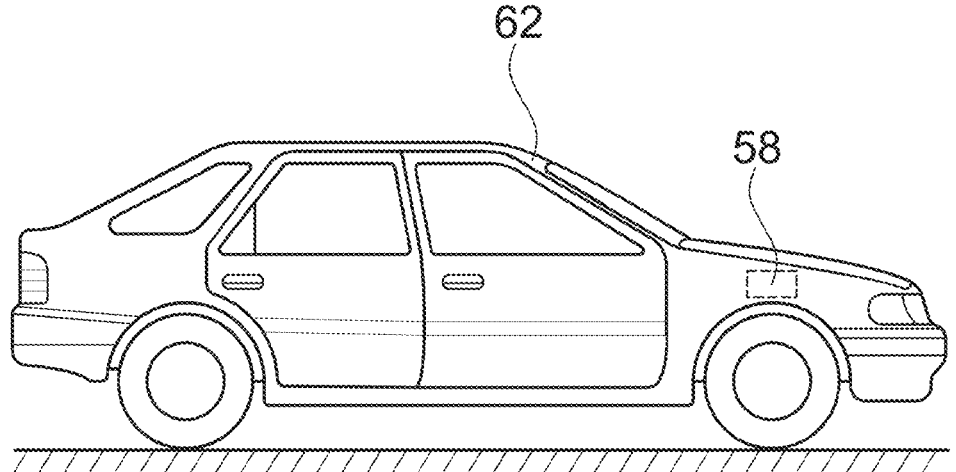

(52) U.S. Cl.
CPC ...... *B60G 2204/62* (2013.01); *B60G 2500/11* (2013.01); *B60G 2600/21* (2013.01); *B60G 2800/162* (2013.01); *B60G 2800/916* (2013.01)

(58) Field of Classification Search
CPC .......... B60G 2600/21; B60G 2800/162; B60G 2800/916
See application file for complete search history.

(56) References Cited

U.S. PATENT DOCUMENTS

| | | | | |
|---|---|---|---|---|
| 9,855,811 | B2 * | 1/2018 | Murakami | F16F 9/516 |
| 11,466,748 | B2 * | 10/2022 | Malmborg | F16F 9/34 |
| 2008/0272561 | A1 * | 11/2008 | Monk | B60G 21/06 280/124.16 |
| 2010/0163357 | A1 * | 7/2010 | Hunter | F16F 9/56 188/319.2 |
| 2014/0116825 | A1 * | 5/2014 | Lindeman | F16F 9/464 188/266.2 |
| 2015/0081171 | A1 * | 3/2015 | Ericksen | B60G 17/08 701/37 |
| 2016/0089950 | A1 * | 3/2016 | Yamaguchi | B60G 17/08 188/266.2 |
| 2016/0090146 | A1 * | 3/2016 | Murakami | F16F 9/3488 188/266.2 |
| 2016/0263958 | A1 * | 9/2016 | Murakami | F16F 15/002 |
| 2016/0280315 | A1 * | 9/2016 | Murakami | F16F 9/3292 |
| 2016/0369862 | A1 * | 12/2016 | Miwa | F16F 9/185 |
| 2018/0339566 | A1 * | 11/2018 | Ericksen | B60G 17/016 |
| 2018/0347722 | A1 | 12/2018 | Bähr et al. | |
| 2021/0102596 | A1 * | 4/2021 | Malmborg | F16F 9/465 |
| 2023/0070735 | A1 | 3/2023 | Kadokura | |

FOREIGN PATENT DOCUMENTS

| | | | |
|---|---|---|---|
| DE | 102013106215 | A1 | 12/2014 |
| DE | 102017111726 | A1 | 12/2018 |
| DE | 102019117233 | A1 | 12/2020 |
| DE | 112021001030 | T5 | 12/2022 |
| EP | 2813737 | A1 | 12/2014 |
| JP | H07-71502 | A | 3/1995 |

OTHER PUBLICATIONS

International Search Report of the International Searching Authority dated May 19, 2023 issued in corresponding International Patent Application No. PCT/EP2022/086733 (English translation only).
International Preliminary Report on Patentability of the International Searching Authority mailed Jun. 20, 2024 and Written Opinion of the International Searching Authority mailed May 19, 2023 in corresponding International Patent Application No. PCT/EP2022/086733 (English translation only).

* cited by examiner

62

58

CONTROL VALVE DEVICE FOR CONTROLLING DAMPING CHARACTERISTICS, AND HYDRAULIC FLOW-THROUGH SOLENOID VALVE

CROSS-REFERENCE TO RELATED APPLICATIONS

This patent application is a U.S. national stage application of international patent application PCT/EP2022/086733, filed on Dec. 19, 2022, which is based on and claims priority to German patent application DE 10 2021 134 565.0, filed on Dec. 23, 2021, the contents of which are incorporated herein by reference.

PRIOR ART

The invention concerns a control valve device, a hydraulic flowed-through solenoid valve, a vehicle, and a method.

Chassis damper valves with a fail-safe function have already been proposed, wherein, however, in the known chassis damper valves the fail-safe function is always limited, for design reasons, only to a rebound direction of the chassis damper or only to a compression direction of the chassis damper.

The objective of the invention is in particular to provide a generic device with advantageous damping properties. The objective is achieved according to the invention.

Advantages of the Invention

A control valve device for a regulation of damping characteristics, in particular of shock absorbers, such as chassis shock absorbers of vehicles, is proposed, the control valve device comprising a valve slide and a hydraulic fail-safe unit which is configured, in a de-energized operation state, in particular of the control valve device and/or of a solenoid valve comprising the control valve device, to provide a fail-safe damping characteristic of the valve slide, the damping hardness of which in a rebound direction lies between a minimally possible rebound damping hardness and a maximally possible rebound damping hardness, and the damping hardness of which in a compression direction lies between a minimally possible compression damping hardness and a maximally possible compression damping hardness. As a result, advantageous damping properties are achievable. Advantageously, a fail-safe function for bidirectionally flowed-through solenoid valves is obtainable. Advantageously, a pleasant and safe damping characteristic is achievable even in the event of a failure of an electromagnet of a chassis damper valve, in the event of a failure of an actuation of the electromagnet of the chassis damper valve and/or in the event of a power failure concerning the chassis damper valve. Advantageously, a safe operation state is established in the solenoid valve. Advantageously, unfavorable operation states, such as soft or hard de-energized operation states, are avoidable. The fail-safe damping characteristic of the control valve device according to the invention advantageously lies in the rebound direction and in the compression direction in each case in a middle range of damping hardness. In particular, a damping hardness is adjustable in a fail-safe mode. "Configured" is in particular to mean specially programmed, designed and/or equipped. By an object being configured for a specific function is in particular to be understood that the object fulfills and/or carries out this specific function in at least one application state and/or operation state.

Furthermore, a control valve device for a regulation of damping characteristics, in particular of shock absorbers, such as chassis shock absorbers of vehicles, is proposed, the control valve device comprising a valve slide and comprising a hydraulic fail-safe unit which is configured to provide, in a de-energized operation state, a fail-safe damping characteristic of the valve slide, the damping hardness of which in the rebound direction lies between a minimally possible rebound damping hardness and a maximally possible rebound damping hardness, and/or the damping hardness of which in the compression direction lies between a minimally possible compression damping hardness and a maximally possible compression damping hardness, wherein the valve slide comprises at least one hydraulic effective surface and at least one further hydraulic effective surface, preferably at least a first further hydraulic effective surface and a second further hydraulic effective surface, wherein the hydraulic effective surface and the further hydraulic effective surface (s) are arranged on the valve slide relative to one another such that they hydraulically counteract one another, in particular during a damping process, and wherein the tensile or compressive forces to be damped act in particular on the hydraulic effective surfaces, wherein, in order to generate the fail-safe damping characteristic, the hydraulic fail-safe unit comprises a hydraulic effective sub-surface which is at least hydraulically connectable to one of the hydraulic effective surfaces. As a result, advantageous damping properties are achievable. As a result, a safe operation state is advantageously established in the event of a failure of an electromagnet of a chassis damper valve, in the event of a failure of an actuation of the electromagnet of the chassis damper valve and/or in the event of a power failure concerning the chassis damper valve. Advantageously, unfavorable operation states, such as soft and/or hard de-energized operation states, can be avoided. The valve slide in particular separates a pressure side of a chassis damper valve comprising the control valve device from a pressure-free side of the chassis damper valve. In particular, the pressure side may alternate depending on an application of a tensile force or a compressive force. Opening of the separation of pressure side and pressure-free side by the valve slide will cause a damping by means of an oil flow. In particular, the valve slide comprises the first further hydraulic effective surface, which preferably counteracts the hydraulic effective surface at least in the event of a pressure load, in particular of the chassis damper comprising the control valve device. In particular, in this case a pressure of the pressure load acts on the hydraulic effective surface and on the first further hydraulic effective surface. In particular, the valve slide comprises the second further hydraulic effective surface, which preferably counteracts the hydraulic effective surface at least in the event of a tensile load, in particular of the chassis damper comprising the control valve device. In particular, in this case a pressure of the tensile load acts on the hydraulic effective surface and on the second further hydraulic effective surface. In particular, there is no operation state in which the valve slide is seated on a valve seat and the same pressure acts on both further hydraulic effective surfaces. In particular, one of the further hydraulic effective surfaces (the first further hydraulic effective surface) is effective only in the event of a pressure load, while the other one of the further hydraulic effective surfaces (the second further hydraulic effective surface) is effective only in the event of a tensile load. In particular, after connection to the hydraulic effective surface, the hydraulic effective sub-surface can also be separated/disconnected from the hydraulic effective surface again. In particular, the connectable hydraulic effective sub-surface is configured, preferably by being connected, to variably enlarge the hydraulic effective surface, which in particular, in the event of a damping process, hydraulically counteracts either the first further hydraulic effective surface or the second further hydraulic effective surface. In particular, the connectable hydraulic effective sub-surface is realized as an individual continuous surface. Alternatively, the connectable hydraulic effective sub-surface may also be realized from a plurality of separate/separable surfaces, which may be connectable/disconnectable simultaneously or in a staggered manner.

If the control valve device comprises the second further hydraulic effective surface, which hydraulically counteracts the hydraulic effective surface, wherein the further hydraulic effective surface is configured for an engagement of compressive forces that are to be damped and wherein the second further hydraulic effective surface is configured for an engagement of tensile forces that are to be damped, it is advantageously possible to obtain bidirectional damping with a fail-safe function.

Furthermore, it is proposed that the hydraulic effective surface is larger than the first further hydraulic effective surface, and/or that the hydraulic effective surface is larger than the second further hydraulic effective surface, in particular independently of whether the connectable hydraulic effective sub-surface is connected to the hydraulic effective surface or not. As a result, advantageous damping properties are achievable. In particular, there is no operation state in which the valve slide is seated on the valve seat and the first further hydraulic effective surface is combinable with additional hydraulic effective surfaces such that a combined first further hydraulic effective surface would be larger than the hydraulic effective surface. In particular, there is no operation state in which the valve slide is seated on the valve seat and the second further hydraulic effective surface is combinable with additional hydraulic effective surfaces in such a way that a combined second further hydraulic effective surface would be larger than the hydraulic effective surface. In particular, there is no operation state of the control valve device in which the hydraulic effective surface is smaller than the first further hydraulic effective surface or than the second further hydraulic effective surface. In particular, the hydraulic effective sub-surface, preferably a totality of all hydraulic effective sub-surfaces, is dimensioned such that it is at least 25%, preferably at least 40%, advantageously at least 60%, preferably approximately 80% and preferentially at most 100% of an effective hydraulic effective surface, wherein the effective hydraulic effective surface results from a difference between the opposite-situated hydraulic effective surfaces in an energized (normal) operation state, in which the hydraulic effective sub-surface(s) is/are hydraulically separate from the hydraulic effective surface.

Beyond this, it is proposed that at least a portion of the hydraulic effective sub-surface, preferably the entire connectable hydraulic effective sub-surface, is arranged spatially separate from the hydraulic effective surface, in particular from the remaining portion of the hydraulic effective surface which the hydraulic effective sub-surface is assigned to. This allows achieving advantageous damping properties. Advantageously, in particular low-leakage or leak-free connection and disconnection of the hydraulic effective sub-surface is enabled. In particular, the connectable hydraulic effective sub-surface is arranged spaced apart from the hydraulic effective surface.

It is also proposed that the hydraulic effective sub-surface is realized by one or several pin elements or by a ring element. This allows achieving advantageous constructional properties. In particular, the pin element(s) is/are arranged eccentrically relative to a central movement axis of the valve slide. In particular, several pin elements are arranged, preferably on a circular annulus, around the central movement axis of the valve slide. In particular, a shape of the hydraulic effective sub-surface formed by the pin element(s) may have any desired shape, e.g. a circular shape, a circle-segment shape, an oval shape, a polygon shape, a rectangular shape, etc. The ring element that alternatively forms the hydraulic effective sub-surface in particular extends around the central movement axis of the valve slide. The ring element that alternatively forms the hydraulic effective sub-surface may be realized in a circular shape or an oval shape. Preferably the central movement axis of the valve slide extends through a center of the ring element. An implementation with several, in particular concentrically-arranged, ring elements as connectable hydraulic sub-elements is also conceivable.

In addition, it is proposed that the valve slide, which forms the hydraulic effective surfaces except for the hydraulic effective sub-surface, interacts with the pin element(s) and/or the ring element in such a way that the pin element(s) and/or the ring element follow/s movements of the valve slide, in particular along the central movement axis of the valve slide. This enables a simple structural implementation of the control valve device having the advantages of the invention. Advantageously, a high degree of reliability and/or safety can be achieved. In particular, the pin element(s) or the ring element may be realized separately from the valve slide, i. e. only adjoin the valve slide, such that a co-sliding is effected by the valve slide movement. Alternatively, the pin element(s) or the ring element may be connected to the valve slide or may be realized integrally with the valve slide. A shape of the pin elements is preferably variable according to requirements.

Furthermore, it is proposed that the fail-safe unit comprises a mechanical fail-safe device configured to connect, in the de-energized operation state, the hydraulic effective sub-surface automatically to the at least one hydraulic effective surface. As a result, a safe and reliable fail-safe function is advantageously achievable. In particular, the fail-safe device is configured for mechanically opening and/or closing a hydraulic path that connects the hydraulic effective surface to the connectable hydraulic effective sub-surface. In particular, in the de-energized operation state at least the solenoid valve, preferably at least a magnet coil of the solenoid valve and/or at least a control unit of the solenoid valve is de-energized. In particular, the de-energized operation state forms a fault operation state. In particular, the mechanical fail-safe device is free of permanent magnets.

If the mechanical fail-safe device herein comprises a fail-safe armature element, which is in particular actuatable magnetically and which is configured for opening and closing a hydraulic connection, in particular the hydraulic path, between the hydraulic effective sub-surface and the at least one hydraulic effective surface, it is advantageously possible to additionally use a magnet coil, which in a normal operation state is configured to generate a resistance against an opening of the valve slide, for an implementation of the fail-safe function. In particular, advantageous properties with regard to construction, for example compactness and/or reduced complexity, are achievable. The fail-safe armature element is in particular realized differently from a main armature of an electromagnet of the solenoid valve, which is in particular configured to generate the resistance against an opening of the valve slide induced by a tensile or compressive force that is to be damped. In particular, the main armature and the fail-safe armature element comprise at least substantially identical movement axes. In particular, the movement axis of the fail-safe armature element overlaps with the central movement axis of the valve slide. In particular, in the case of an activated magnetic field of the magnet coil, the fail-safe armature element is configured to be attracted to the magnet coil, in particular to a magnetic core of the magnet coil, and herein in particular to be moved in a direction pointing away from the valve slide and/or pointing towards the main armature.

If the mechanical fail-safe device moreover comprises a spring element, which is configured to move the fail-safe armature element in the de-energized operation state into an open position, in which the hydraulic connection between the hydraulic effective sub-surface and the at least one hydraulic effective surface is open, a safe and reliable fail-safe function is advantageously achievable. In particular, in the case of a deactivated magnetic field of the magnet coil, the fail-safe armature element is configured to be pushed away from the magnet coil, in particular from the magnetic core of the magnet coil, by the spring element, and herein in particular to be moved in a direction pointing towards the valve slide and/or pointing away from the main armature.

If the control valve device furthermore comprises the electromagnet with the magnet coil which is configured to move the fail-safe armature element, in particular against a spring force of the spring element, preferably if there is sufficient energization of the magnet coil, into a closed position in which the hydraulic connection between the hydraulic effective sub-surface and the at least one hydraulic effective surface is closed, a safe and reliable fail-safe function is enabled, which in particular in the case of a functional electromagnet is always automatically deactivated. In particular, the electromagnet, preferably the magnet coil, is identical to the electromagnet, in particular the magnet coil, which controls the main armature and/or generates the resisting force of the valve slide against an opening of the valve slide brought about by compressive forces or tensile forces applied at the valve slide.

It is further proposed that the electromagnet comprises a tappet element, which is in particular likewise actuatable by the magnet coil and which is configured, in an energized (normal) operation state, for adjusting a variable damping characteristic as a function of the generated magnetic field strength. As a result, properties with regard to construction, in particular with regard to compactness and/or reduction of complexity, are advantageously achievable. In particular, the tappet element is configured for an interaction with the main armature of the control valve device/of the solenoid valve. In particular, the main armature generates the movement of the tappet element and/or generates a force applied at the tappet element or transmitted by the tappet element (to the valve slide).

It is moreover proposed that the fail-safe armature element and the tappet element are arranged relative to the magnet coil in such a way that the forces generated by the magnetic field of the magnet coil act on the fail-safe armature element and on the tappet element in directions that are at least substantially opposed to each other. This advantageously allows achieving properties with regard to construction, in particular with regard to compactness and/or reduction of complexity. In particular, the tappet element is pushed out of the coil interior and/or is moved away from the magnet coil by the magnetic field of the magnet coil, in particular by the interaction with the main armature. In particular, the fail-safe armature element is pulled towards the coil interior and/or moved towards the magnet coil, in particular by a direct interaction with the magnetic field of the electromagnet. In particular, the spring element creates a gap between the magnetic core of the electromagnet and the fail-safe armature element. In particular, when a magnetic field is generated by the electromagnet, the fail-safe armature element seeks to move into an energetically most favorable state, in which the gap between the magnetic core of the electromagnet and the fail-safe armature element is closed or minimized. Preferably the tappet element and the main armature are realized separately from each other, wherein the tappet element is supported at least indirectly at the main armature and therefore follows the movements of the main armature. Alternatively, the tappet element may also be fixedly connected to the main armature or may even be realized integrally with the main armature. Preferably, however, the tappet element and the main armature are made of magnetically differently effective materials. In particular, the tappet element may also be regarded as a structural unit comprising the main armature and a tappet that interacts with the main armature.

Furthermore, a bypass channel is proposed, which is configured to hydraulically connect the hydraulic effective sub-surface, at least in an energized (normal) operation state, to an, in particular hydraulic, reservoir and/or to an, in particular currently, pressure-free side. This advantageously allows achieving a high degree of safety and/or reliability of the fail-safe device. Advantageously, this allows achieving a movability of the pin element(s) and/or of the ring element that does not interfere with the normal operation. In particular, the hydraulic effective sub-surface is hydraulically effective only if the bypass channel is closed. In particular, the hydraulic effective sub-surface enlarges the hydraulic effective surface only if the bypass channel is closed.

If the spring element, in particular in addition to the adjustment of the position of the fail-safe armature element, is configured to open and close the bypass channel depending on the position of the fail-safe armature element, properties with regard to a construction, in particular with regard to compactness and/or to reduction of complexity, are advantageously achievable. In particular, the spring element is realized as something like a disk spring element or the spring element has, in an end region, an end surface configured to close an opening of the bypass channel that faces towards the spring element. In particular, the spring element is configured to close the bypass channel in the expanded (relaxed) state. In particular, the spring element is configured to open the bypass channel in the compressed (tensioned) state. In particular, the spring element is arranged at least partially in an interior of the bypass channel. In particular, the spring element is configured to close the bypass channel if the fail-safe armature element is not attracted by the electromagnet and/or if the fail-safe armature element is in a first position, namely moved away from the magnetic core. In particular, the spring element is configured to open the bypass channel if the fail-safe armature element is attracted by the electromagnet and/or if the fail-safe armature element is in a second position, namely moved towards the magnetic core.

Furthermore, a hydraulic flowed-through solenoid valve, in particular a hydraulic bidirectionally flowed-through chassis damper valve, with the control valve device, and a vehicle with the hydraulic flowed-through solenoid valve, as well as a method for regulating damping characteristics, in particular of shock absorbers, by means of the control valve device are proposed. This allows achieving advantageous damping properties. Advantageously, a fail-safe function for bidirectionally flowed-through solenoid valves is obtainable. Advantageously, it is possible to achieve a pleasant and safe damping characteristic, even in the event of a failure of an electromagnet of the bidirectionally flowed-through chassis damper valve, in the event of a failure of an actuation of the electromagnet of the bidirectionally flowed-through chassis damper valve and/or in the event of a power failure concerning the bidirectionally flowed-through chassis damper valve. In particular, the hydraulic flowed-through solenoid valve is configured for internal installation in a damper tube of a chassis damper of the vehicle. In principle, the functional principle described herein, which is based on the connectable effective sub-surface, is also applicable to unidirectionally regulatable solenoid valves.

It is also proposed that a fail-safe damping characteristic is provided in a de-energized manner, wherein the damping hardness of said fail-safe damping characteristic in a rebound direction lies between a minimally possible tensile damping and a maximally possible tensile damping, and the damping hardness of said fail-safe damping characteristic in a compression direction at the same time lies between a minimally possible damping hardness and a maximally possible damping hardness. This allows achieving advantageous damping properties. Advantageously, a fail-safe function for bidirectionally flowed-through solenoid valves is obtainable. Advantageously, it is possible to achieve a pleasant and safe damping characteristic, even in the event of a failure of an electromagnet of a chassis damper valve, in the event of a failure of an actuation of the electromagnet of the chassis damper valve and/or in the event of a power failure concerning the chassis damper valve.

In addition, it is proposed that, in the event of a failure of an electrical power supply to the control valve device, in at least one fail-safe method step, a hydraulic effective sub-surface is automatically connected to a hydraulic effective surface, which is in particular arranged opposite a side that is to be damped. This allows achieving advantageous damping properties. Advantageously, unfavorable operation states, such as soft de-energized operation states and/or hard de-energized operation states, are avoidable.

Beyond this, it is proposed that, during normal power-supplied operation, in at least one method step, the hydraulic effective sub-surface is automatically separated hydraulically from the hydraulic effective surface, which is in particular situated opposite the side that is to be damped. This advantageously allows ensuring a high degree of reliability and/or safety of the fail-safe function. By the phrase "hydraulically separated" is in particular to be understood that there is no longer any hydraulic force transmission taking place between the hydraulic effective surface and the hydraulic effective sub-surface.

It is moreover proposed that, during normal power-supplied operation, in at least one method step, a bypass channel is automatically opened, which hydraulically connects the hydraulic effective sub-surface to an, in particular hydraulic, reservoir and/or to a pressure-free side. This advantageously allows preventing undesired influencing of the damping characteristic by the hydraulic effective sub-surface during normal power-supplied operation.

Figure 6:
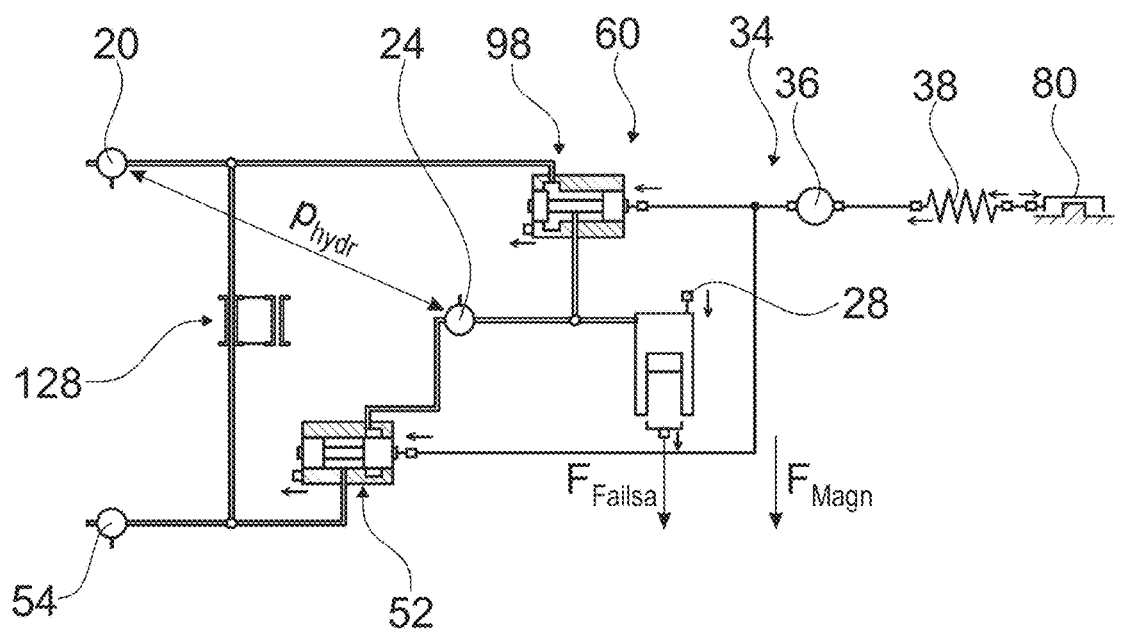

In particular, in the method, if there is no or only a small amount of energization (e. g. 0 A to approximately 0.5 A), an applied hydraulic pressure acts on the connectable effective sub-surface, which generates a force onto the valve slide as it is supported on the valve slide (see FIG. 6 of the accompanying drawings). In particular, the force generated by the connectable hydraulic effective sub-surface acts parallel and in a same direction as a magnetic force which is generated by the electromagnet, presses the valve slide onto the valve seat and is transmitted to the valve slide by the tappet element. In this way advantageously an increase of a counterforce to an input pressure of the solenoid valve is induced. The valve slide then in particular only opens at a higher input pressure than in a situation without a connected hydraulic effective sub-surface. In particular, at higher currents (e. g. $>0.5$ A to $I_{max}$) the connection of the connectable hydraulic effective sub-surface to the input pressure is interrupted (see FIG. 7 of the accompanying drawings).

Thus the additional hydraulic force induced by the hydraulic effective sub-surface can be no longer generated, which in particular results in a lower damping force. The valve slide then in particular opens already at lower input pressures. In particular if the current at the electromagnet increases, the damping force will increase proportionally to the current. Herein, in particular at a specific current, the damping force of the failsafe state with the connected hydraulic effective sub-surface is achieved, and if the current at the electromagnet continues to increase, the damping force will then exceed the damping force of the failsafe state.

In particular, each of the hydraulic effective surfaces may be continuous or may be divided into sections which are separate from each other but interact.

The control valve devices according to the invention, the solenoid valve according to the invention, the vehicle according to the invention and/or the method according to the invention shall not be limited to the above-described application and implementation. In particular, in order to fulfil a functionality that is described here, the control valve devices according to the invention, the solenoid valve according to the invention, the vehicle according to the invention and/or the method according to the invention may comprise a number of individual method steps, elements, components and units that differs from a number given here.

DRAWINGS

Further advantages will become apparent from the following description of the drawings. In the drawings an exemplary embodiment of the invention is illustrated. The drawings, the description and the claims contain a plurality of features in combination. Someone skilled in the art will purposefully also consider the features individually and will find further expedient combinations.

Figure 2:
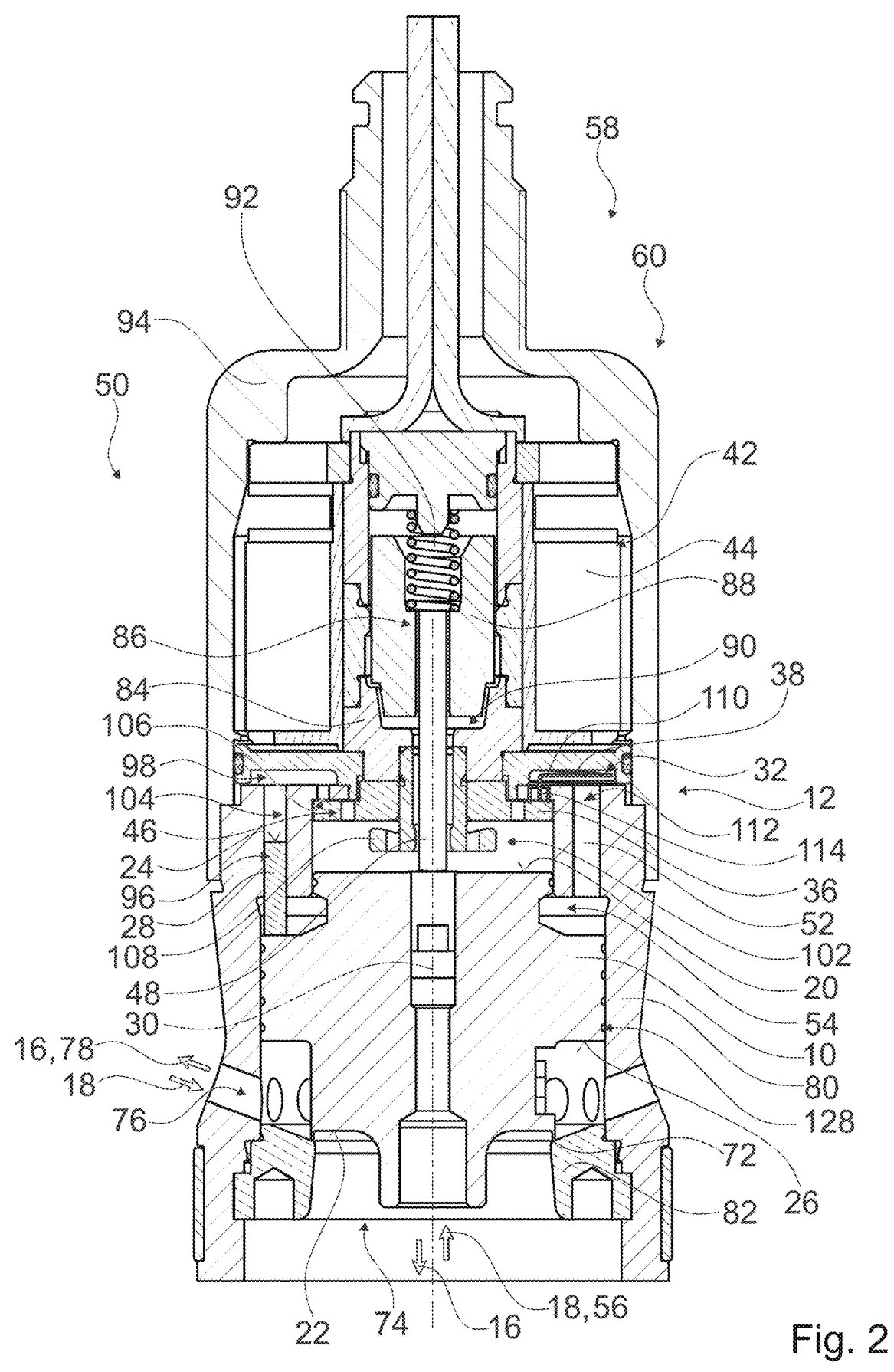
Figure 3:
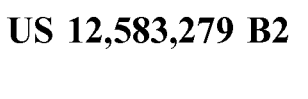
Figure 4:
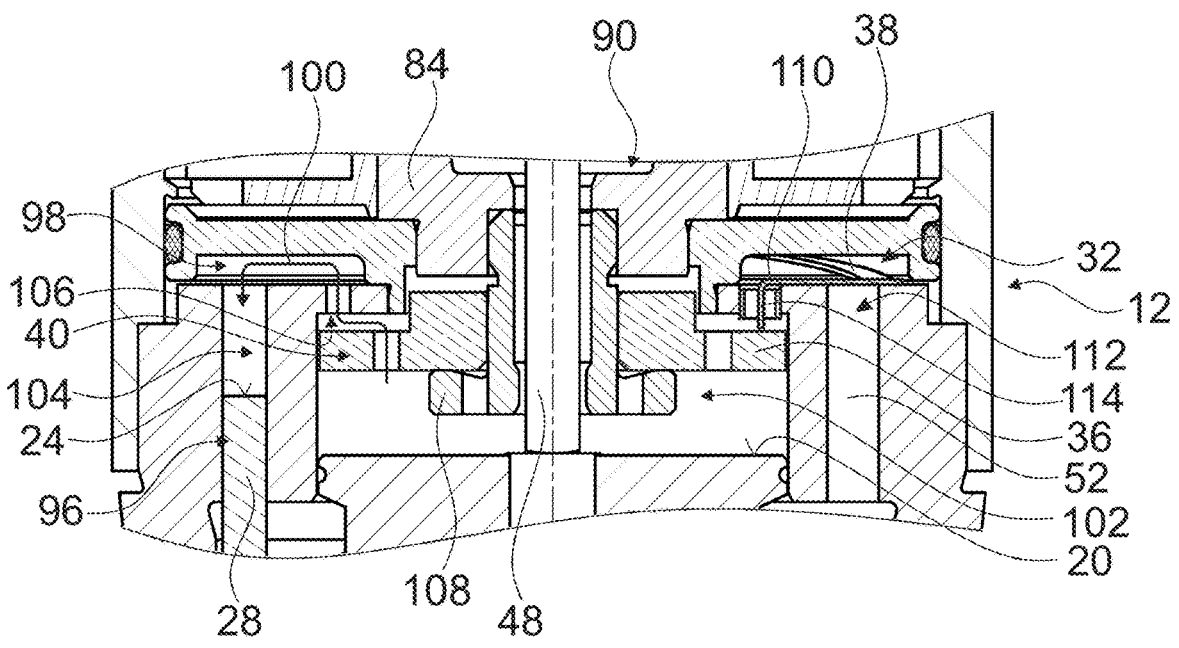
Figure 5:
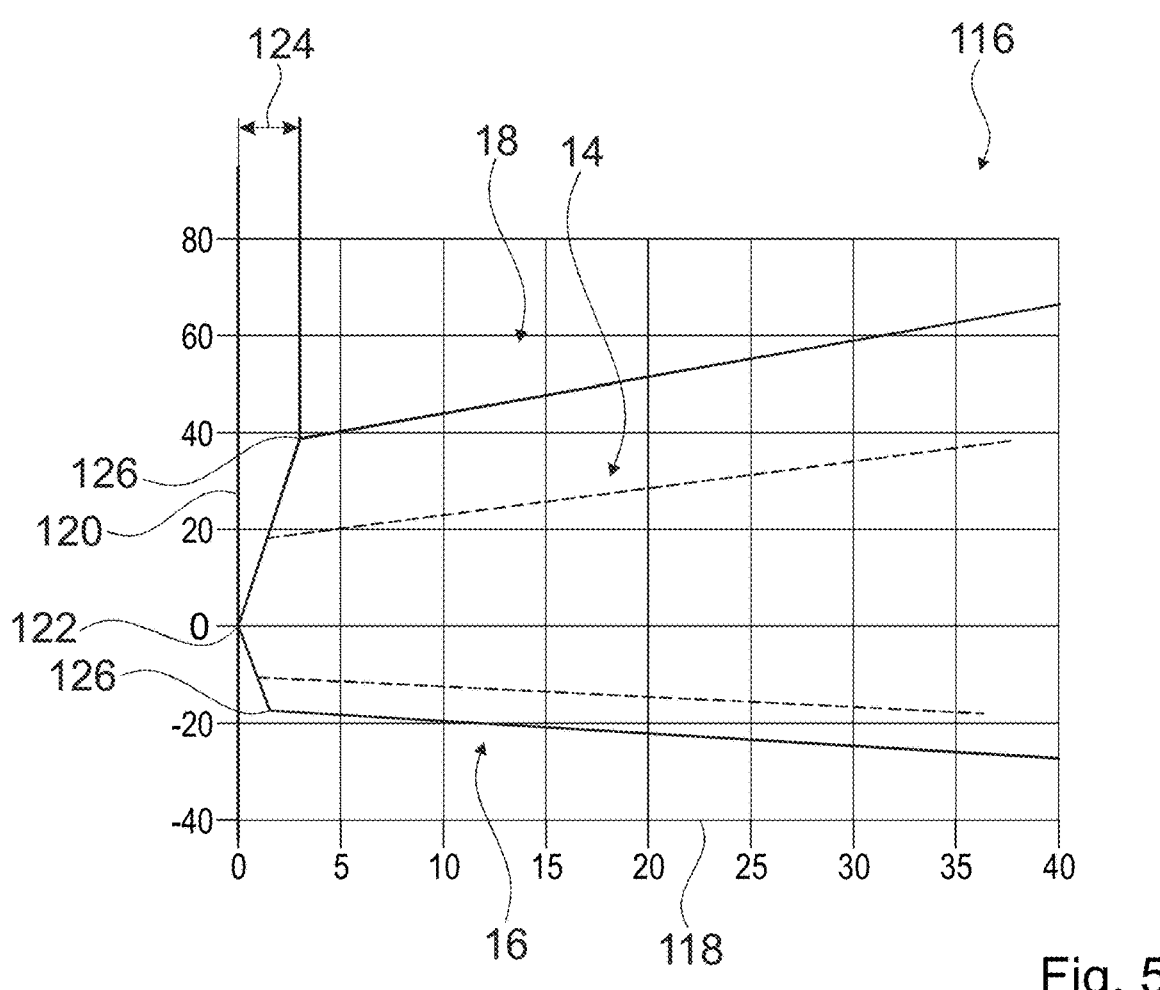
Figure 7:
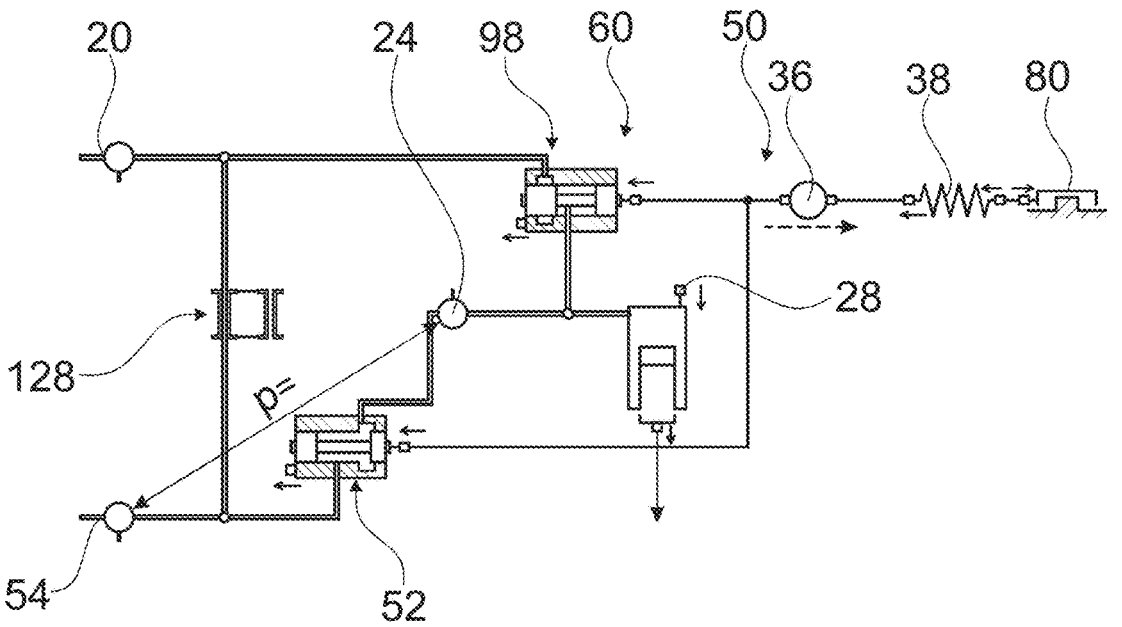
Figure 8:
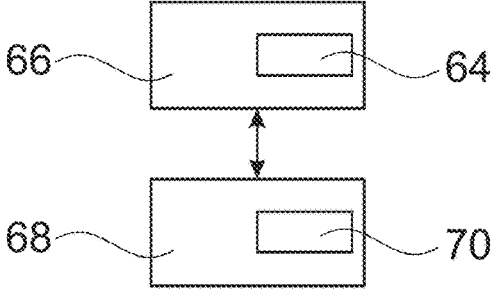

In the drawings:

FIG. 1 shows a vehicle with a hydraulic flowed-through solenoid valve,

FIG. 2 shows a schematic section through the hydraulic flowed-through solenoid valve with a control valve device in an energized (normal) operation state, FIG. 3 shows the schematic section through the hydraulic flowed-through solenoid valve with the control valve device in a de-energized operation state, FIG. 4 shows an enlarged detail of the sectional view from FIG. 3, FIG. 5 shows a damping characteristic diagram of the solenoid valve with the control valve device, FIG. 6 shows a schematic hydraulic circuit diagram of the control valve device in the de-energized operation state, FIG. 7 shows a schematic hydraulic circuit diagram of the control valve device in the energized (normal) operation state, and FIG. 8 shows a flow chart of a method for regulating damping characteristics of shock absorbers by means of the control valve device.

DESCRIPTION OF THE EXEMPLARY EMBODIMENT

FIG. 1 schematically shows a vehicle 62 with a hydraulic flowed-through solenoid valve 58. The vehicle 62 is realized as a passenger car. Alternative vehicles with chassis, such as other road vehicles, agricultural vehicles, rail vehicles, aircraft, etc., are likewise conceivable. The hydraulic flowed-through solenoid valve 58 is configured for regulating a damping of shock absorbers (not shown) of the vehicle 62.

FIGS. 2 and 3 show schematic sections through the hydraulic flowed-through solenoid valve 58. The hydraulic flowed-through solenoid valve 58 is realized as a hydraulic bidirectionally flowed-through chassis damper valve for a damping of the chassis of the vehicle 62. The hydraulic flowed-through solenoid valve 58 comprises a control valve device 60. FIG. 2 shows the hydraulic flowed-through solenoid valve 58, in particular the control valve device 60, in an energized (normal) operation state 50. FIG. 3 shows the hydraulic flowed-through solenoid valve 58, in particular the control valve device 60, in a de-energized operation state 34, in particular in a failsafe operation state.

The hydraulic flowed-through solenoid valve 58 comprises a first pressure port 74 and a second pressure port 76. Tensile forces 78 and compressive forces 56, which are to be damped by the shock absorber, act on the pressure ports 74, 76. For example, at the first pressure port 74 shock absorber compressive forces generate a pressure acting on a valve slide 10 of the hydraulic flowed-through solenoid valve 58, and at the second pressure port 76 shock absorber tensile forces generate a pressure acting on the valve slide 10. When shock absorber compressive forces 56 act on the valve slide 10, the second pressure port 76 implements a pressure-free side of the hydraulic flowed-through solenoid valve 58. When shock absorber tensile forces 78 act on the valve slide 10, the first pressure port 74 implements a pressure-free side of the hydraulic flowed-through solenoid valve 58. If the pressure applied at the valve slide 10 exceeds a limit value (opening pressure), the valve slide 10 opens a connection between the two pressure ports 74, 76. The pressure ports 74, 76 are realized as openings in a valve housing 80 of the hydraulic flowed-through solenoid valve 58. The valve slide 10 is arranged completely within the valve housing 80. The valve housing 80, in particular a valve seat element 82 connected to the valve housing 80, forms a valve seat 72. The valve slide 10 is configured to sit on the valve seat 72 in a sealing fashion. During a movement of the valve slide 10 along a central movement axis 30 of the valve slide 10, the valve seat 72 opens and closes. By adjusting a force with which the valve slide 10 is pressed onto the valve seat 72, a damping hardness of the hydraulic flowed-through solenoid valve 58, in particular of the chassis damper, can be adjusted. If the valve slide 10 is pressed strongly onto the valve seat 72, the damping characteristic is hard. If the valve slide 10 is pressed less strongly onto the valve seat 72, the damping characteristic is soft. The hydraulic flowed-through solenoid valve 58 comprises an electromagnet 42. The electromagnet 42 comprises a magnet coil 44. The electromagnet 42 is configured for adjusting a force required for a lifting of the valve slide 10 from the valve seat 72. Depending on a magnetic field strength generated by the magnet coil 44, the force required for lifting the valve slide 10 from the valve seat 72 increases. The electromagnet 42 is realized as a reluctance magnet. The electromagnet 42 comprises a magnetic core 84. The magnetic core 84 is arranged to a large portion in an interior 86 of the magnet coil 44. The magnetic core 84 protrudes from the interior 86 of the magnet coil 44 towards the valve slide 10. The hydraulic flowed-through solenoid valve 58 comprises a main armature 88. The main armature 88 is realized as a magnet armature comprising a ferromagnetic material. The main armature 88 is arranged in the interior 86 of the magnet coil 44. The main armature 88 is supported movably in the interior 86 of the magnet coil 44. An air gap 90 of the electromagnet 42 realized as a reluctance magnet is arranged between the main armature 88 and the magnetic core 84. By the magnetic field of the magnet coil 44, the main armature 88 is pressed towards the magnetic core 84 and/or is held in a position close to the magnetic core 84. On a side situated opposite the magnetic core 84, the main armature 88 is supported by a compression spring 92 on an upper side of the hydraulic flowed-through solenoid valve 58. The electromagnet 42 comprises a magnet housing 94 that surrounds the magnet coil 44. The valve housing 80 and the magnet housing 94 are connected to one another sealingly. The hydraulic flowed-through solenoid valve 58, in particular the electromagnet 42, comprises a tappet element 48. The tappet element 48 is fixedly connected to the main armature 88 or is supported at the main armature 88. The tappet element 48 is configured for transmitting a force generated by the main armature 88 to the valve slide 10. The tappet element 48 projects from the interior 86 of the magnet coil 44 towards the valve slide 10. The tappet element 48 is actuatable via the magnet coil 44. The tappet element 48 is configured, in the energized (normal) operation state 50 to adjust a variable damping characteristic of the solenoid valve 58 depending on the magnetic field strength generated by the magnet coil 44.

The control valve device 60 is configured for a regulation of damping characteristics of shock absorbers. The control valve device 60 comprises the valve slide 10. The valve slide 10 is configured to create, depending on its opening position, a damping of a tensile or compressive force applied at the hydraulic flowed-through solenoid valve 58. If an engaging tensile or compressive force is sufficiently large to lift the valve slide 10 from the valve seat 72, a pressure fluid flows between the pressure ports 74, 76, as a result of which a damping of the engaging tensile or compressive forces is created.

The control valve device 60 comprises a hydraulic failsafe unit 12. The hydraulic failsafe unit 12 is configured, in the de-energized operation state 34, to provide a fail-safe damping characteristic 14 (see FIG. 5) of the valve slide 10, the damping hardness of which in a rebound direction 16 lies between a minimally possible rebound damping hardness and a maximally possible rebound damping hardness, and the damping hardness of which in a compression direction 18 lies between a minimally possible compression damping hardness and a maximally possible compression damping hardness (see FIG. 5).

The valve slide 10 comprises a hydraulic effective surface 20. The hydraulic effective surface 20 is arranged on a side of the valve slide 10 facing towards the electromagnet 42. The hydraulic effective surface 20 is arranged on a side of the valve slide 10 which is situated opposite the first pressure port 74. The hydraulic effective surface 20 is arranged on a side of the valve slide 10 situated opposite the second pressure port 76.

The valve slide 10 comprises a first further hydraulic effective surface 22. The first further hydraulic effective surface 22 is arranged on a side of the valve slide 10 facing away from the electromagnet 42. The first further hydraulic effective surface 22 is arranged on a side of the valve slide 10 facing towards the first pressure port 74. The first further hydraulic effective surface 22 is configured for an engagement of compressive forces that are to be damped. Compressive forces acting on the shock absorber act on the first further hydraulic effective surface 22/generate a compressive force acting on the first further hydraulic effective surface 22. The first further hydraulic effective surface 22 is arranged on a side of the valve slide 10 situated opposite the hydraulic effective surface 20. The hydraulic effective surface 20 and the first further hydraulic effective surface 22 are arranged on the valve slide 10 relative to each other in such a way that they hydraulically counteract each other in a damping process. The first further hydraulic effective surface 22 is arranged parallel to the hydraulic effective surface 20. The hydraulic effective surface 20 is larger than the first further hydraulic effective surface 22.

The valve slide 10 comprises a second further hydraulic effective surface 26. The second further hydraulic effective surface 26 is arranged on a side of the valve slide 10 facing away from the electromagnet 42. The second further hydraulic effective surface 26 is arranged in a middle region of the valve slide 10 between the hydraulic effective surface 20 and the first further hydraulic effective surface 22. The second further hydraulic effective surface 26 is arranged on a side of the valve slide 10 facing towards the second pressure port 76. The second further hydraulic effective surface 26 is configured for an engagement of tensile forces that are to be damped. Tensile forces acting on the shock absorber act on the second further hydraulic effective surface 26/generate a compressive force acting on the second further hydraulic effective surface 26. The second further hydraulic effective surface 26 is arranged on a side of the valve slide 10 situated opposite the hydraulic effective surface 20. The hydraulic effective surface 20 and the second further hydraulic effective surface 26 are arranged on the valve slide 10 relative to each other in such a way that they hydraulically counteract each other in a damping process. The second further hydraulic effective surface 26 is arranged parallel to the hydraulic effective surface 20. The hydraulic effective surface 20 is larger than the second further hydraulic effective surface 26.

The valve slide 10 is realized in such a way, in particular provided with switchable channels (not shown) in such a way, that when a compressive force acts on the first further hydraulic effective surface 22, the same pressure also acts on the hydraulic effective surface 20. The valve slide 10 is realized in such a way, in particular provided with switchable channels (not shown) in such a way, that when a tensile force acts on the second further hydraulic effective surface 26, the same pressure also acts on the hydraulic effective surface 20.

FIG. 4 shows an enlarged detail of the sectional view from FIG. 3, in which the control valve device 60 is in the de-energized operation state 34 (failsafe operation state). For the purpose of creating the fail-safe damping characteristic 14 (see FIG. 5), the hydraulic failsafe unit 12 comprises a hydraulic effective sub-surface 24, which is hydraulically connectable to the hydraulic effective surface 20. Alternatively or additionally, the hydraulic effective sub-surface 24 could also be disconnectable/connectable from/to the first further hydraulic effective surface 22 or from/to the second further hydraulic effective surface 26.

The hydraulic effective sub-surface 24 is arranged spatially separate from the hydraulic effective surface 20 to which it is assigned. The hydraulic effective sub-surface 24 is implemented by at least one pin element 28. The hydraulic effective sub-surface 24 is realized separately/differently from the valve slide 10. The valve slide 10 interacts with the pin element 28 in such a way that the pin element 28 follows the movements of the valve slide 10 along the central movement axis 30 of the valve slide 10. The pin element 28 is placed on the valve slide 10. The pin element 28 moves within a guide bore 96 in the valve housing 80, the diameter of the guide bore 96 corresponding approximately to an outer diameter of the pin element 28.

The fail-safe unit 12 comprises a partly mechanical fail-safe device 32. The fail-safe device 32 is configured, in the de-energized operation state 34 (see FIG. 3), to connect the hydraulic effective sub-surface 24 automatically to the hydraulic effective surface 20. The fail-safe device 32 comprises a fail-safe armature element 36. The fail-safe armature element 36 is actuatable magnetically. The fail-safe armature element 36 is configured for opening and closing a hydraulic connection between the connectable hydraulic effective sub-surface 24 and the hydraulic effective surface 20. In the case shown, the hydraulic connection is realized as a hydraulic path 100 formed by a fluid channel 98 of the control valve device 60. The fluid channel 98 connects a region 102 above the hydraulic effective surface 20 to a region 104 above the connectable hydraulic effective sub-surface 24. The fluid channel 98 is realized in a disk shape. The fluid channel 98 forms an annular channel. If the hydraulic path 100 is open/present, the hydraulic effective surface 20 is connected to the connectable hydraulic effective sub-surface 24, in particular such that the same pressures act on the hydraulic effective surface 20 and on the connectable hydraulic effective sub-surface 24. If the hydraulic path 100 is closed/blocked/not present, the hydraulic effective surface 20 is not connected to the connectable hydraulic effective sub-surface 24, such that different pressures can act on the hydraulic effective surface 20 and on the connectable hydraulic effective sub-surface 24 (see FIG. 2). In an energized (normal) operation state 50 (see FIG. 2), the fail-safe armature element 36 closes an opening 106 of the fluid channel 98 to the region 102 that is located above the hydraulic effective surface 20. In the de-energized operation state 34, the fail-safe armature element 36 releases the opening 106 of the fluid channel 98 to the region 102 that is located above the hydraulic effective surface 20 (see FIG. 3). For this purpose, the fail-safe armature element 36 is realized such that it can be flowed through.

The fail-safe armature element 36 interacts with the magnetic field generated by the magnet coil 44. If there is an energization of the magnet coil 44, the fail-safe armature element 36 is attracted to the magnetic core 84 of the magnet coil 44. In the energized (normal) operation state 50, the fail-safe armature element 36 abuts on the magnetic core 84. The fail-safe armature element 36 and the tappet element 48 are arranged relative to the magnet coil 44 in such a way that the forces generated by the magnetic field of the magnet coil 44 act on the fail-safe armature element 36 and on the tappet element 48 in directions that are at least substantially opposed to each other. The fail-safe armature element 36 and the main armature 88 are arranged on opposite sides of the magnetic core 84.

The fail-safe device 32 comprises a spring element 38. The spring element 38 of the fail-safe device 32 is configured to move, in the de-energized operation state 34, the fail-safe armature element 36 into an open position 40, in which the hydraulic connection/the hydraulic path 100 between the hydraulic effective sub-surface 24 and the hydraulic effective surface 20 is open. The spring element 38 is configured to push the fail-safe armature element 36 away from the magnetic core 84/from the magnet coil 44. The spring element 38 is configured, in particular in the de-energized operation state 34, to move the fail-safe armature element 36 towards the valve slide 10. The spring element 38 is configured, in particular in the de-energized operation state 34, to move the fail-safe armature element 36 into a position in which a distance from the magnet coil 44 is maximized. The fail-safe armature element 36 is movable between a stop on the magnetic core 84 and a stop element 108 that is situated opposite the magnetic core 84 in the direction of the central movement axis 30. The stop element 108 is positionally fixed relative to the magnetic core 84.

If there is sufficient energization of the magnet coil 44, the electromagnet 42 with the magnet coil 44 is configured to move the fail-safe armature element 36 against a spring force of the spring element 38 into a closure position 46 (see FIG. 2), in which the hydraulic connection/the fluid channel 98 between the hydraulic effective sub-surface 24 and the hydraulic effective surface 20 is closed.

The control valve device 60 comprises a bypass channel 52. The bypass channel 52 is realized as a recess, in particular a bore, in the valve housing 80. The bypass channel 52 is configured to hydraulically connect the hydraulic effective sub-surface 24 to a reservoir 54 of the solenoid valve 58 and/or to the respective currently pressure-free side of the solenoid valve 58. In the energized (normal) operation state 50, the bypass channel 52 is configured to hydraulically connect the hydraulic effective sub-surface 24 to the reservoir 54 and/or to the respective currently pressure-free side of the solenoid valve 58. The spring element 38 is configured to open and close the bypass channel 52 depending on the position of the fail-safe armature element 36. The spring element 38 comprises a closure element 110 or is operatively connected to a closure element 110 realized separately from the spring element 38. The closure element 110 is configured to cover an opening 112 of the bypass channel 52, in particular toward the fluid channel 98, preferably in a fluid-tight manner. If the spring element 38 is maximally relaxed, the closure element 110 closes the bypass channel 52. If the spring element 38 is tensioned, the closure element 110 opens the bypass channel 52 towards the fluid channel 98. The closure element 110 or the spring element 38 comprises a support element 114, via which the closure element 110 or the spring element 38 is supported at the fail-safe armature element 36. If in the de-energized operation state 34 the fail-safe armature element 36 is in the position maximally removed from the magnet coil 44 and/or in the position abutting the stop element 108, the bypass channel 52 is closed. A force transmission from the spring element 38 to the fail-safe armature element 36 which, in particular in the de-energized operation state 34, presses the fail-safe armature element 36 to the stop element 108, is effected via the support element 114. If the magnetic field of the magnet coil 44 is activated, the fail-safe armature element 36 is pulled towards the interior 86 of the magnet coil 44/towards the magnetic core 84, which results in a force acting on the support element 114, such that the closure element 110, which is at least operatively connected to the support element 114, is lifted from the opening 112 of the bypass channel 52 and the bypass channel 52 is opened towards the fluid channel 98. The movement of the fail-safe armature element 36 towards the interior 86 of the magnet coil 44/towards the magnetic core 84 generates a compression/tension of the spring element 38 which, in particular in the event of a sudden drop/failure of the magnetic field of the magnet coil 44, will result in the control valve device 60 assuming the configuration shown in FIG. 3.

If there are currents above a limit current (e. g. approximately >0.5 A) at the electromagnet 42, the fail-safe armature element 36 is attracted against a spring force of the spring element 38 and thus closes the hydraulic path 100 to the hydraulic effective sub-surface 24, wherein at the same time the bypass channel 52 to the reservoir 54/to the pressure-free side is opened. If, on the other hand, the current at the electromagnet 42 drops below the limit current (approximately <0.5 A), the fail-safe armature element 36 is reset by the spring element 38 and thus releases the hydraulic path 100 to the hydraulic effective sub-surface 24, wherein at the same time the bypass channel 52 is closed by the closure element 110 (actuated by the spring element 38).

FIG. 5 shows a damping characteristic diagram 116 of the solenoid valve 58 with the control valve device 60 according to the invention, in which a damper speed (in l/min) is plotted on the abscissa 118 and a damper force (in bar) is plotted on the ordinate 120. Here positive damper forces correspond to compressive forces (compression direction 18) and negative damper forces correspond to tensile forces (rebound direction 16). A narrow region of steep slope starting from a zero point 122 of the damping characteristic diagram 116 indicates a respective leakage 124 of the solenoid valve 58 in the tensile and compression directions 16, 18. The points in which the slopes decrease are referred to as opening points 126 of the solenoid valve 58 and indicate when the valve slide 10—and not leakages of the valve slide 10 or other components—starts determining the damping characteristic. The strength of the damper force (i.e., the "height" of the solid line) is adjustable by regulating the magnetic field strength of the electromagnet 42. The solid lines indicate a damping characteristic in the energized (normal) operation state 50 for a specific magnetic field. The dashed lines indicate a damping characteristic in the de-energized operation state 34, in which the fail-safe function of the control valve device 60 is active. The dashed lines indicate the (bidirectional) fail-safe damping characteristic 14. The damping characteristic in the de-energized operation state 34 lies in the compression direction 18 above the zero line and below (pressure) damping characteristics which can be adjusted in the energized (normal) operation state 50. The damping characteristic in the de-energized operation state 34 lies in the rebound direction 16 below the zero line and above (tensile) damping characteristics which can be adjusted in the energized (normal) operation state 50.

FIG. 6 shows a schematic hydraulic circuit diagram of the control valve device 60 in the de-energized operation state 34 (respectively in an operation state in which a current at the electromagnet 42 is at least below 0.5 A). FIG. 7 shows the schematic hydraulic circuit diagram of the control valve device 60 in the energized (normal) operation state 50 (respectively in an operation state in which a current at the electromagnet 42 is at least above 0.5 A). In addition to the already described components of the control valve device 60, in FIGS. 6 and 7 a leakage gap 128 (annular gap) is shown, which is created by the valve slide 10 in the valve housing 80 and determines the location of the opening point 126 in the damping characteristic diagram 116 of the solenoid valve 58. The larger the leakage gap 128, the larger the leakage, and the smaller the dynamics of the solenoid valve 58 (the opening point 126 is then shifted to the right in the damping characteristic diagram 116). The proposed implementation advantageously allows keeping the leakage low/the leakage gap 128 small, as a result of which in particular a high level of dynamics can be achieved even at low damper speeds.

FIG. 8 shows a method for regulating damping characteristics of shock absorbers by means of the control valve device 60. In the method, in a method step 64, in particular if a fault operation state occurs, the fail-safe damping characteristic 14 is provided in a de-energized fashion, wherein the damping hardness of the fail-safe damping characteristic 14 in the rebound direction 16 lies between a minimally possible tensile damping and a maximally possible tensile damping, and the damping hardness of the fail-safe damping characteristic 14 in the compression direction 18 lies at the same time between a minimally possible damping hardness and a maximally possible damping hardness. In the event of a failure of an electrical power supply to the control valve device 60 or in the event of a failure of a controlling of the electromagnet 42, a hydraulic effective sub-surface 24 is automatically connected to a hydraulic effective surface 20 in a fail-safe method step 66 of the method, which in particular forms part of the method step 64. In the method, in a method step 68, during normal power-supplied operation, the hydraulic effective sub-surface 24 is automatically separated hydraulically from the hydraulic effective surface 20. In a method step 70, which in particular forms part of the method step 68, in normal power-supplied operation, the bypass channel 52 is automatically opened, which hydraulically connects the hydraulic effective sub-surface. 24 to the reservoir 54 and/or to the pressure-free side of the solenoid valve 58.

The invention claimed is:

1. A control valve device for a regulation of damping characteristics, comprising a valve slide and comprising a hydraulic fail-safe unit which is configured, in a de-energized operation state, to provide a fail-safe damping characteristic of the valve slide, a damping hardness of which in a rebound direction lies between a minimally possible rebound damping hardness and a maximally possible rebound damping hardness, and/or the damping hardness of which in a compression direction lies between a minimally possible compression damping hardness and a maximally possible compression damping hardness, wherein the valve slide comprises at least one hydraulic effective surface and at least one further hydraulic effective surface, wherein the hydraulic effective surface and the further hydraulic effective surface are arranged on the valve slide relative to each other in such a way that they hydraulically counteract each other, wherein in order to generate the fail-safe damping characteristic, the hydraulic fail-safe unit comprises a hydraulic effective sub-surface which is at least hydraulically connectable to one of the hydraulic effective surfaces.

2. The control valve device according to claim 1, further comprising a second further hydraulic effective surface, which hydraulically counteracts the hydraulic effective surface, wherein the further hydraulic effective surface is configured for an engagement of compressive forces that are to be damped and wherein the second further hydraulic effective surface is configured for an engagement of tensile forces that are to be damped.

3. The control valve device according to claim 2, wherein the hydraulic effective surface is larger than the further hydraulic effective surface, and/or that the hydraulic effective surface is larger than the second further hydraulic effective surface.

4. The control valve device according to claim 1, wherein at least a portion of the hydraulic effective sub-surface is arranged spatially separate from the hydraulic effective surface to which the hydraulic effective sub-surface is assigned.

5. The control valve device according to claim 1, wherein the hydraulic effective sub-surface is realized by one or several pin elements or by a ring element.

6. The control valve device according to claim 5, wherein the valve slide, which forms the hydraulic effective surfaces except for the hydraulic effective sub-surface, interacts with the pin element(s) and/or the ring element in such a way that the pin element(s) and/or the ring element follow/s movements of the valve slide.

7. The control valve device according to claim 1, wherein the fail-safe unit comprises an at least partly mechanical fail-safe device, which is configured to connect, in the de-energized operation state, the hydraulic effective sub-surface automatically to the hydraulic effective surface.

8. The control valve device according to claim 7, wherein the at least partly mechanical fail-safe device comprises a fail-safe armature element, which is configured for opening and closing a hydraulic connection between the hydraulic effective sub-surface and the at least one hydraulic effective surface.

9. The control valve device according to claim 8, wherein the at least partly mechanical fail-safe device comprises a spring element, which is configured to move, in the de-energized operation state, the fail-safe armature element into an open position, in which the hydraulic connection between the hydraulic effective sub-surface and the at least one hydraulic effective surface is open.

10. The control valve device according to claim 8, further comprising an electromagnet with a magnet coil, which is configured to move the fail-safe armature element into a closed position in which the hydraulic connection between the hydraulic effective sub-surface and the at least one hydraulic effective surface is closed.

11. The control valve device according to claim 10, wherein the electromagnet comprises a tappet element, which is in likewise actuatable via the magnet coil and which is configured, in an energized (normal) operation state, for adjusting a variable damping characteristic as a function of a generated magnetic field strength.

12. The control valve device according to claim 11, wherein the fail-safe armature element and the tappet element are arranged relative to the magnet coil in such a way that forces generated by the magnetic field of the magnet coil act on the fail-safe armature element and on the tappet element in directions that are at least substantially opposed to each other.

13. The control valve device according to claim 11, further comprising a bypass channel, which is configured to hydraulically connect the hydraulic effective sub-surface, at least in an energized (normal) operation state, to a reservoir and/or to a currently pressure-free side.

14. The control valve device according to claim 13, wherein the at least partly mechanical fail-safe device comprises a spring element, which is configured to move, in the de-energized operation state, the fail-safe armature element into an open position, in which the hydraulic connection between the hydraulic effective sub-surface and the at least one hydraulic effective surface is open, and wherein the spring element is configured to open and close the bypass channel depending on the position of the fail-safe armature element.

15. A hydraulic bidirectionally flowed-through chassis damper valve with the control valve device according to claim 1.

16. A vehicle with the hydraulic bidirectionally flowed-through chassis damper valve according to claim 15.

17. A method for regulating damping characteristics, by means of the control valve device according to claim 1, wherein, in the event of a failure of an electrical power supply to the control valve device, in at least one fail-safe method step the hydraulic effective sub-surface is automatically connected to the hydraulic effective surface.

18. The method according to claim 17, wherein, during normal power-supplied operation, in at least one method step the hydraulic effective sub-surface is automatically separated hydraulically from the hydraulic effective surface.

19. The method according to claim 17, wherein during normal power-supplied operation, in at least one method step a bypass channel is automatically opened, which hydraulically connects the hydraulic effective sub-surface to a reservoir and/or to a pressure-free side.

\* \* \* \* \*